June 8, 1965  E. C. WARD ETAL  3,187,828
AUTOMATIC LOCKING DEVICE FOR WEIGHING SCALE
Filed March 25, 1963  3 Sheets-Sheet 1
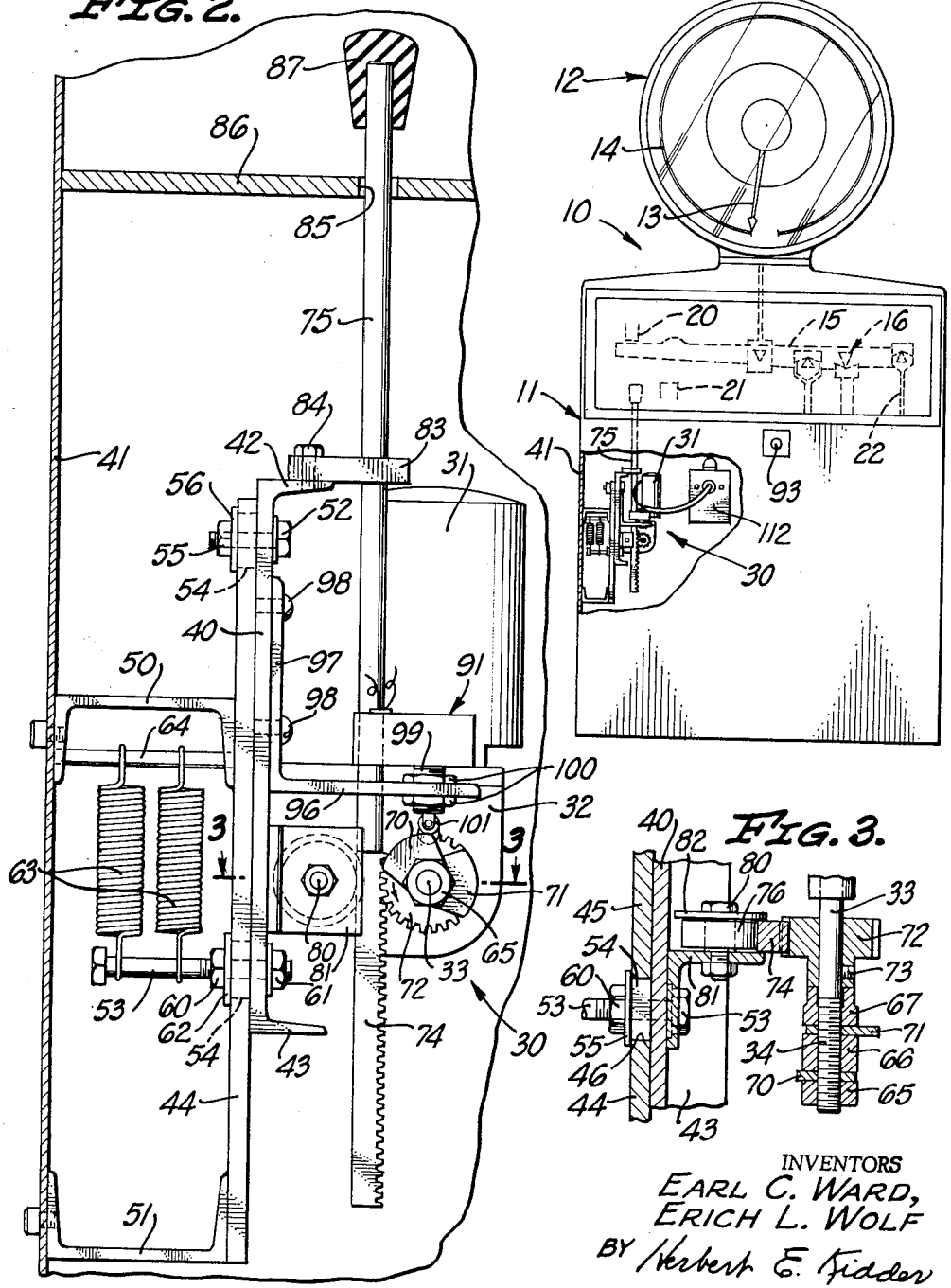
INVENTORS
EARL C. WARD,
ERICH L. WOLF
BY Herbert E. Fidder
AGENT June 8, 1965  E. C. WARD ETAL  3,187,828
AUTOMATIC LOCKING DEVICE FOR WEIGHING SCALE
Filed March 25, 1963  3 Sheets-Sheet 2
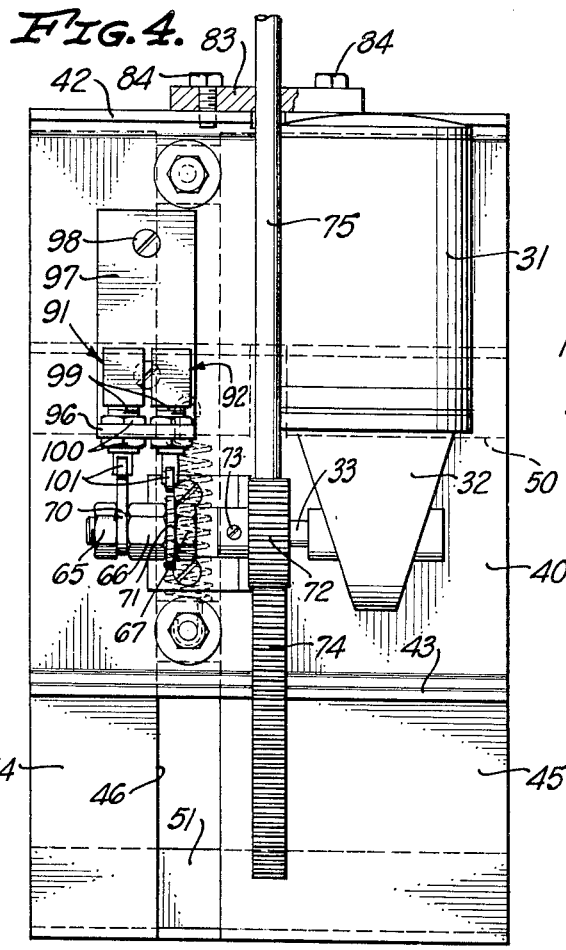
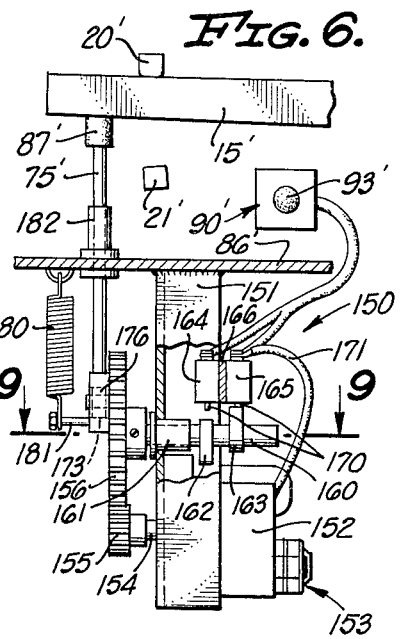
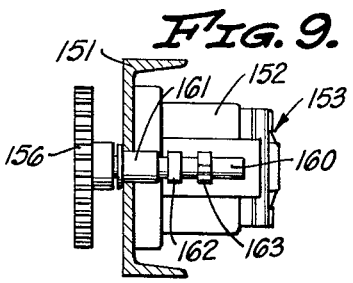
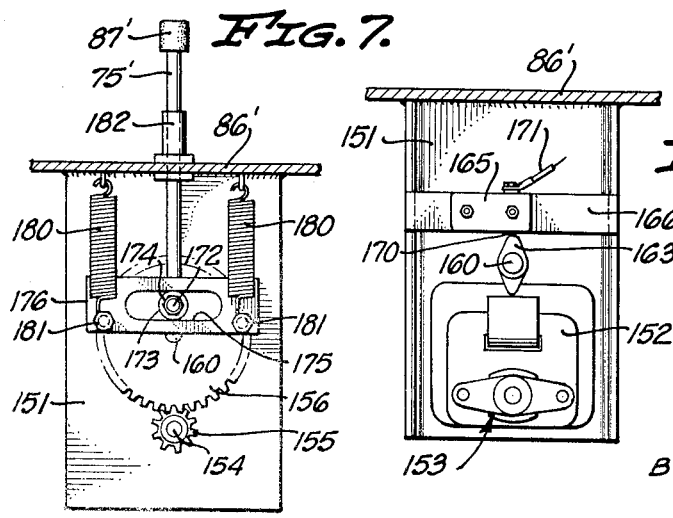
INVENTORS
EARL C. WARD
ERICH L. WOLF
BY Herbert E. Kidder
AGENT INVENTORS
EARL C. WARD,
ERICH L. WOLF
BY Herbert E. Kidder
AGENT

United States Patent Office 3,187,828
Patented June 8, 1965

3,187,828
AUTOMATIC LOCKING DEVICE FOR
WEIGHING SCALE
Earl C. Ward, 20437 Harvard Way, and Erich L. Wolf,
4071 Overland St., both of Riverside, Calif.
Filed Mar. 25, 1963, Ser. No. 267,495
10 Claims. (Cl. 177—157)

The present invention relates to locking devices for weighing scales, and its primary object is to provide a new and improved automatic locking device that operates to lock the scale mechanism at all times except momentarily during the actual operation of weighing the load.

All heavy duty scales, particularly those having platforms onto which heavily loaded trucks are driven to be weighed, are provided with locks for immobilizing the scale mechanism until the load has been placed on the platform and the scale adjusted to the appropriate working range. When everything is in readiness, the lock is released and the load is weighed, after which the lock is again engaged before the load is driven off the platform. These locking devices are usually hand-operated by means of a lever, or locking crank, and if always operated in the proper manner, would be entirely satisfactory. However, experience has shown that almost invariably a scale lock will sooner or later be left unlocked inadvertently when a load is driven onto or off of the platform, with the result that the tare beam lever and other moving parts of the scale are violently shock loaded, and the mechanism is broken. Such breakdowns usually occur at peak periods, and therefore are doubly expensive in that lost income must be added to the cost of repairing the damage.

Attempts have been made in the past to provide automatic locking devices for scales, which would not be subject to human error on the part of the scale operator. Among such devices is an automatic scale lock shown in our United States Patent No. 2,727,736, which overcomes most of the problems inherent in hand-operated locks. One problem remains, however, and that is the fact that prior scale locking devices have released or relocked the scale mechanism rather abruptly, so that under certain circumstances, the mechanism may still be damaged. This is particularly true when the scale is abruptly unlocked while the unit weights carried by the tare beam lever are adjusted for a lower working range than the weight of the load on the platform. When suddenly released, the tare beam lever is caused to swing upwardly against its limit stop with such violence that the mechanism is damaged. Also, too-abrupt engagement of the tare beam lever by an automatic locking member may sometimes result in a damaging shock load to the mechanism.

One of the principal objects of the invention is to provide an automatic scale lock which has none of the shortcomings described above, and which engages and releases the tare beam lever in a gentle, controlled manner so that the lever is positively prevented from striking against its limit stops with enough force to damage any part of the scale mechanism.

Another important object of the invention is to provide an automatic scale locking device that can be applied to most existing scales without extensive modification or alteration of the scale, and which can easily be adapted for use with weight printers, remote controls, delayed time devices, multiple switching, lock and key operation, coin operation, and many other devices or modes of operation, as will be apparent to those skilled in the art.

A further object of the invention is to provide an automatic scale lock that requires no attention on the part of the operator, other than the touch of a button, to complete the entire cycle of unlocking, weighing, and relocking. The scale lock of the present invention can be remotely controlled, and one weighman can operate as many as three scales that are in continuous, uninterrupted operation.

These and other objects and advantages of the present invention will become apparent to those skilled in the art upon consideration of the following detailed description of the preferred embodiment thereof, reference being had to the accompanying drawings, wherein:

FIGURE 1 is a front elevational view of a cabinet-type scale with the front cover partially cut away to show the locking mechanism of the present invention mounted therein;

FIGURE 2 is an enlarged elevational view of the automatic locking mechanism;

FIGURE 3 is a fragmentary sectional view, taken at 3—3 in FIGURE 2;

FIGURE 4 is an elevational view of the mechanism, as seen from the right-hand side in FIGURE 2;

FIGURE 6 is a front elevational view of another embodiment of the invention;

FIGURE 7 is another view of the same, as seen from the left-hand side of FIGURE 6;

FIGURE 8 is a view as seen from the right-hand side of FIGURE 6; and

FIGURE 9 is a sectional view, taken at 9—9 in FIGURE 6.

Figure 5:
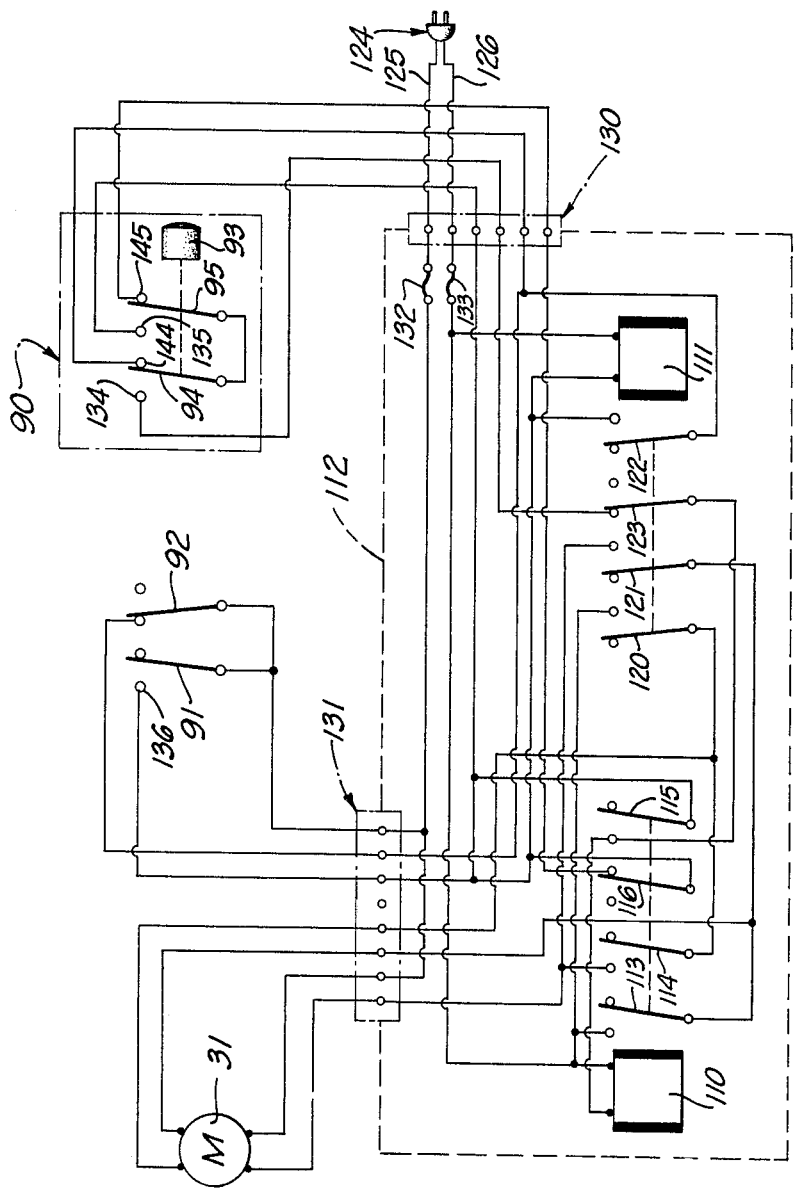
FIGURE 5 is a schematic diagram, showing the electrical circuit of the invention.

In the embodiment shown in FIGURES 1-5 of the drawings, the scale mechanism is designated in its entirety by the reference numeral 10, and includes a cabinet 11, indicating head 12, and scale platform (not shown). The scale platform is connected in the usual manner to a series of fulcrumed lever arms in the cabinet 11, which are operatively connected, in turn, to the weight indicating mechanism in the head 12, where a pointer 13 shows on a circular scale of graduations 14 the amount of weight on the platform. Included in the mechanism of the cabinet is a tare beam lever 15, which is fulcrumed at 16 for vertical swinging movement between an upper limit stop 20 and a lower limit stop 21. When the scale platform is empty, the tare beam lever 15 rests against the upper limit stop 20 and the pointer 13 stands at the zero end of the graduated scale 14. The lower limit stop 21 stops the beam lever arm 15 when the weight on the scale platform exceeds the range for which the scale is adjusted, and thus serves to protect the delicate mechanism of the scale indicating head 12 against overload.

A steelyard rod 22 depends from the right-hand end of the tare beam lever 15, and suitable mechanism (not shown) is provided for selectively loading unit weights of varying weights on the lower end of the rod 22 to change the working range of the scale.

The automatic lock of the present invention is designated in its entirety by the reference numeral 30, and includes a reversible electric motor 31 having a speed-reduction gear box 32 from which a horizontal drive shaft 33 projects. The motor 31 and its integral gear box 32 are mounted on a channel iron support 40, having a web disposed in a vertical plane parallel to one of the sides 41 of the cabinet 11, and horizontal flanges 42 and 43 projecting laterally from the top and bottom edges thereof.

The channel iron member 40 serves as a carriage for the motor 31, 32 and other parts to be described presently, and is slidably supported upon two laterally spaced, vertically disposed, co-planar plates 44 and 45. The adjacent edges of the two spaced-apart plates 44 and 45 define a vertical slot 46, which serves as a guide for the member 40. The plates 44, 45 are joined together by two vertically spaced, parallel channel irons 50 and 51 which are attached, in turn, to the side wall 41 of the cabinet 11.

The member 40 lies flat against the outer side of the plates 44, 45 and is slidably secured thereto by means of two vertically spaced bolts 52 and 53, which pass through apertures in the member 40 and through square spacers 54 disposed within the slot 46. The top bolt 52 is secured by a nut 55 and washer 56, the latter being of sufficient diameter to overlap the edges of the slot 46 on the backside of plates 44, 45. The bottom bolt 53 is considerably longer than the top bolt, and extends in the opposite direction through the spacer 54 and member 40. Two spaced nuts 60 and 61 are screwed onto the threaded end of the bolt 53 on opposite sides of the contiguous members 54, 40, and there is a large diameter washer 62 under nut 60, which overlies the edges of the slot 46, as shown in FIGURE 3. Two side-by-side coil springs 63 are hooked at their bottom ends onto the laterally projecting shank of the bolt 53, and at their top ends onto a rod 64. The springs 63 are wound with their coils normally closed tightly against one another in the relaxed condition, and the springs are stretched when the member 40 moves downwardly from the position shown in FIGURE 2. Thus, the member 40, together with its associated motor 31, gear box 32, and other parts to be described presently, is yieldingly held by the springs 63 at the position shown, and is movable downwardly therefrom when the load on the member 40 exceeds the tension of the springs.

The drive shaft 33 projects from the gear box 32 for a considerable distance, and the outer portion of its length is threaded at 34 to receive three nuts 65, 66 and 67. Clamped tightly between the center nut 66 and the outer nut 65 is a first cam 70, while a second cam 71 is clamped between the center nut 66 and the inner nut 67. Also mounted on the drive shaft 33 between the inner nut 67 and the gear box 32 is a pinion 72 having a laterally projecting hub which is locked against turning on the shaft by a set screw 73. The pinion 72 meshes with the teeth of a vertically movable rack 74, the top end of which is attached to the bottom extremity of a push rod 75. The rack 74 is held in engagement with the pinion 72 by a back-up roller 76 that rotates on a shouldered pivot bolt 80 projecting horizontally from an angle bracket 81. The rack 74 is also confined on opposite sides between a washer 82 and the edge of the angle bracket 81, which restrain the rack against sidewise movement.

About midway of its length, the pushrod 75 passes through and is slidably engaged by a guide 83, which is secured by screws 84 to the top flange 42 of angle iron member 40. Above the guide 83, the rod 75 extends up through a hole 85 in a horizontal shelf 86 of the cabinet 11, and mounted on its top end is a rubber bumper 87. The rubber bumper 87 engages the end of the tare beam lever 15 at the outer end thereof when the rod 75 is raised by the motor 31, and the tare beam lever is pushed upwardly until it engages the upper limit stop 20.

The operation of the motor 31 is controlled by a circuit, shown schematically in FIGURE 5, which includes a push button switch means 90, a first cam-actuated switch means 91, and a second cam-actuated switch means 92. The push button switch means 90 consists of a push button 93 mounted on the front of cabinet 11, which actuates two switches 94 and 95. Switch 94 is normally open, while switch 95 is normally closed. When the push button 93 is pressed, switch 94 is momentarily closed, and switch 95 is opened. Switch 95 may also have a time-delay dashpot (not shown) connected thereto, so that when the push button 93 is released, switch 95 will not close until a certain predetermined time interval has elapsed, so as to provide a short "dwell" period when the scale is unlocked, for reading the scale or operating a weight printer.

The cam-actuated switch means 91 and 92 consists of two snap-action switches mounted side-by-side on a horizontal flange 96 of an angle bracket 97. The angle bracket 97 is secured to the channel iron member 40 by means of two screws 98, and the switches 91, 92 are positioned directly above the cams 70 and 71, respectively. Projecting downwardly from the bottom side of each of the switches 91 and 92 is a threaded sleeve 99, which passes through a hole in the flange 96 and is clamped thereto by a pair of opposed nuts 100. An actuating push rod extends down through the center of each of the sleeves 99 and terminates in a roller 101, which is positioned to ride on its respective cam 70, 71.

The push-button switch means 90 and cam-actuated switch means 91 and 92 cooperate to actuate two relays 110 and 111 in timed sequence to complete the circuit, first in one way to drive the motor 31 in one direction to unlock the scale, and then in another way to reverse the motor so as to lock the scale again. The relays 110 and 111, together with their associated switches, are contained within a circuit box 112 (FIGURE 1) inside the cabinet 11. Relay 110, when energized, closes three normally open switches 113, 114 and 115, and opens a fourth, normally closed switch 116. Relay 111, when energized, closes three normally open switches 120, 121 and 122, and opens a fourth, normally closed switch 123. In each case, the relay actuates its associated switches against a spring load, so that when the relay is de-energized, the switches are restored to their normally open or closed condition.

A power line supplying current for the system is plugged in at 124, and electrical current is carried into the circuit through two conductors 125 and 126. Two multiple pin, quick disconnect plugs 130 and 131 enable the circuit box 112 to be disconnected from the push button switch 90 and from the motor 31, so that it can be removed from the cabinet 11. Fuses 132 and 133 protect the circuit against electrical overload.

Starting with the scale in the locked condition, the several switches of the circuit will be as shown in FIGURE 5. When push button 93 is depressed, switches 94 and 95 are momentarily closed against contacts 134 and 135, respectively, causing current to be transmitted from line 125 to switch 91, which is closed against contact 136, thence through contact 140 to switch 123, to the coil of relay 110, and back to line 126. Current passing through the coil of relay 110 causes switches 113, 114 and 115 to close, and switch 6 to open. Switch 115 now sends current through the coil of relay 110 to hold the latter when the push button 93 is released. Switch 116 serves as an interlock to prevent simultaneous energization of both relays 110 and 111. Switches 113 and 114 transmit current to the motor 31 in such a way as to drive the motor in the forward direction, i.e., in the direction to lower the push rod 75 from its raised, locked position to its lowered, unlocked position.

During the time that the motor is energized and driving the pinion 72 in the counterclockwise direction, as viewed in FIGURE 2, switch 91 remains closed, while switch 92 is held open by cam 71. As the push rod 75 approaches the end of its downward travel, cam 70 opens switch 91, which de-energizes relay 110; and cam 71 allows switch 92 to close, which energizes relay 111 and thereby closes a new circuit to the motor 31, causing the motor to reverse in direction after coasting to a stop. Switch 122 supplies current to the coil of relay 111, while switch 123 serves as a protective interlock to prevent simultaneous energization of both relays 110 and 111. Switches 120 and 121 transmit current to the motor in such a way as to drive the same in the reverse direction, so as to raise the push rod 75 from its unlocked position to its locked position, wherein the tare beam lever 15 is pressed solidly against the upper limit stop 20.

It will be understood that the push button 93 is depressed only momentarily to initiate the entire sequence of operations, and as soon as the push button is released, switches 94 and 95 return to their normal positions, in engagement with contacts 144 and 145, in readiness to complete the circuit for the reverse operation of the motor when the relay 110 is de-energized and relay 111 is energized.

If desired, switch 95 can be made independent of push button 93, and can be made to close against contact 145 by means of a relay controlled from a weight printer; or switch 95 can be closed by a timer, such as a dashpot after a predetermined time interval. Such modifications will be obvious to those skilled in the art.

Another embodiment of the invention, shown in FIGURES 6 to 9 inclusive, is designated in its entirety by the reference numeral 150. This second form of the invention is mounted on a length of channel iron 151, which is attached to the underside of the cabinet shelf 86' and projects downwardly therefrom. Mounted on the lower end portion of the channel iron 151 is an electric motor 152 having a magnetic brake at 153, which acts to stop the rotating armature almost instantly when the electrical current to the motor is turned off. The motor 152 also has integral speed reduction gears (not shown) which drive the output shaft 154 at a relatively slow speed, of the order of 25 r.p.m.

Mounted on the projecting end of the shaft 154 is a pinion 155, which is meshed with a gear 156. Gear 156 is mounted on one end of a shaft 160, which is journaled in a bushing 161 that passes through the channel iron 151 and is fixed thereto. The shaft 160 projects for some distance beyond the end of the bushing 161, and has two cams 162 and 163 mounted thereon, which actuate two switches 164 and 165, respectively. The switches 164 and 165 are mounted on opposite sides of a supporting bar 166 extending transversely across the width of the channel iron 151 above the shaft 160, and projecting downwardly from the undersides of the switch bodies are buttons 170, which are engaged and depressed by the cams 162, 163 to actuate the switch mechanisms. Switches 164 and 165 are connected to the motor 152 and to the push button switch 90 by electrical wiring 171, and the mode of operation of said switches will be described presently.

The gear 156 is considerably larger in pitch diameter than the pinion 155, being about 4:1 in the embodiment illustrated, and therefore the gear 156 turns at a correspondingly slower speed than the pinion. With the pinion 155 turning at 25 r.p.m., and a 1 to 4 gear ratio, the gear 156 turns at approximately 6¼ r.p.m., and therefore completes one revolution in slightly less than 10 seconds.

Projecting outwardly from the left-hand face of gear 156 (as seen in FIGURE 6), is stub shaft 172, upon which is journaled a roller 173. For convenience, a ball bearing may be used as the roller, in which case the outer race of the bearing serves as the roller 173. The roller 173 is secured on the shaft by a nut 174.

Roller 173 passes through a horizontal slot 175 in a member 176, which is affixed to the bottom end of the push rod 75'. The member 176 is generally rectangular in side elevation, and the slot 175 extends horizontally through the center portion thereof. The width of the slot 175, or vertical between the top and bottom edges thereof, is only a few thousandths of an inch larger than the outside diameter of the roller 173, so that the latter fits snugly within the slot, yet is free to move along the length thereof without binding. The length of the slot 175 is such that the roller 173 can move out to the two horizontally opposed extreme positions as the gear 156 rotates, without touching either end of the slot.

A pair of coil springs 180 are attached to the underside of the shelf 86' on opposite sides of the push rod 75', and hang downwardly therefrom. The bottom ends of the springs 180 are hooked over bolts 181, which project outwardly from the member 176 at the two bottom corners thereof. When stretched, the springs 180 exert an upward pull on the member 176, thereby helping the motor 152 to push the tare beam lever 15' up to the limit stop 20' against the force exerted by any load on the platform.

The push rod 75' passes through a bushing 182 fixed to the shelf 86', and is slidable vertically with respect thereto. As in the first embodiment, there is a rubber bumper 87' on the top end of the push rod, which engages the tare beam lever 15' to push the same upwardly against the limit stop, so as to immobilize the scale mechanism.

The two switches 164 and 165 are connected in parallel between the push button switch 90' and the motor 152. The switches 164, 165 are normally closed, and are opened by their respective cams 162 and 163 when the cams engage and depress the buttons 170. Instead of magnetic relays to hold the circuit closed after the push button 93' has been released, this embodiment of the invention uses a pneumatic time delay holding mechanism (not shown) in the push button switch 90', which holds the circuit in one condition for a predetermined time interval, and then switches the circuit to a second condition. Such time delay mechanisms are well known and widely available in the market, hence it is not deemed necessary to show such mechanism in more detail herein.

When the scale is in locked condition, and the push rod 75' is in its uppermost position, as shown in the drawings, switch 164 is closed, and switch 165 is held open by its cam 163. Depressing the push button 93' closes the circuit through switch 164 to the motor 152, causing the motor to drive the pinion 155 and gear 156 until the latter has completed a half revolution. During this half revolution of gear 156, the member 176 and push rod 75' are pulled down to their lowermost position by the roller 173, thereby releasing the tare beam lever 15' so that the load on the scale platform can be weighed. At the same time, cams 162 and 163 are rotated 180 degrees, opening switch 164 and simultaneously closing switch 165.

When switch 164 is opened, the motor 152 is stopped. However, the simultaneous closing of switch 165 sets up a new electrical circuit to the motor 152, which is open at the push button switch 90' until the time delay holding mechanism in the latter switches the circuit to the said second condition. As the time delay holding mechanism in the push button switch 90' switches over to the said second condition, the electrical circuit to the motor 152 is completed, and the latter again runs until the gear 156 has completed another half revolution, raising the push rod 75' to its uppermost position, and opening switch 165 to stop the motor. The time delay holding mechanism in the push button switch 90' thus provides a brief pause in the operation of the device, while the weight on the platform is either indicated on the dial or is printed by a suitable printer. The motor 152 runs only in one direction, and since it is magnetically braked, there is no coasting problem, hence no need for yieldingly supporting the motor, as in the first embodiment.

While we have shown and described in considerable detail what we believe to be the preferred embodiment of our invention, it will be understood by those skilled in the art that various changes in the shape and arrangement of the several parts without departing from the broad scope of the invention as defined in the following claims:

We claim:

1. An automatic locking device for use with a weighing scale having a beam lever fulcrumed near one end thereof for vertical swinging movement, said beam lever being operatively connected to the indicating mechanism of the scale, comprising:
   an electric motor having a rotary driving member affixed to the drive shaft thereof;
   a linearly movable locking member having a driving connection with said rotary driving member, whereby said locking member is moved successively from a first position in engagement with said beam lever adjacent the end opposite the fulcrum to a second position disengaged from said beam lever, and then back to said first position;

said locking member being smoothly accelerated and moved at a deliberate speed by said driving member, whereby said locking member is smoothly and gently retracted from said beam lever, thereby transferring the load on the scale to the beam lever without shock, and said locking member then re-engaging said beam lever smoothly and gently to lock the same again;

switch means operable to energize said motor and cause the same to drive said locking member through its operating cycle; and means operable to shut off said motor when said locking member has returned to said first position.

2. An automatic locking device for use with a weighing scale having a beam lever fulcrumed near one end thereof for vertical swinging movement, and an operative connection between said beam lever and the indicating mechanism of the scale, said device comprising:

an electric motor having a pinion mounted on the drive shaft thereof;

a linearly movable locking member having rack teeth on one face thereof which mesh with said pinion, said locking member being movable between a first position wherein it engages said beam lever to lock the same securely against movement, and a second position wherein it is disengaged from said beam lever;

switch means operable to energize said motor and cause the same to drive said locking member from said first position to said second position;

means operable to reverse the direction of travel of said locking member when the latter has reached said second position; and means operable to shut off said motor when said locking member has returned to said first position.

3. An automatic locking device for use with a weighing scale having a beam lever fulcrumed near one end thereof for vertical swinging movement, and an operative connection between said beam lever and the indicating mechanism of the scale, said device comprising:

a reversible electric motor having a rotary driving member affixed to the drive shaft thereof;

a linearly movable locking member having a driving connection with said rotary driving member, said locking member being movable between a first position wherein it engages said beam lever to lock the same securely against movement, and a second position wherein it is disengaged from said beam lever;

switch means operable to energize said motor and cause the same to run in one direction so as to drive said locking member from said first position to said second position;

means operable to reverse the direction of said motor as said locking member approaches said second position; and switch means operable to shut off said motor as said locking member approaches said first position.

4. An automatic locking device for use with a weighing scale having a beam lever fulcrumed near one end thereof for vertical swinging movement, and an operative connection between said beam lever and the indicating mechanism of the scale, said device comprising:

a reversible electric motor having a pinion mounted on the drive shaft thereof;

a linearly movable locking member having rack teeth on one face thereof which mesh with said pinion, said locking member being movable between a first position wherein it engages said beam lever to lock the same securely against movement, and a second position wherein it is disengaged from said beam lever;

switch means operable to energize said motor and cause the same to run in one direction so as to drive said locking member from said first position to said second position;

first cam-actuated switch means operable to reverse the direction of said motor as said locking member approaches said second position; and second cam-actuated switch means operable to shut off said motor as said locking member approaches said first position.

5. An automatic locking device as set forth in claim 4, wherein said motor and pinion are mounted on a support that is slidably guided along a path parallel to the line of travel of said locking member; and spring means yieldingly holding said support against movement in one direction while said locking member is being driven in the opposite direction toward said first position, said support being movable in said one direction when the force exerted by said locking member against said beam lever exceeds the tension of said spring means.

6. An automatic locking device as set forth in claim 4, wherein said beam lever is pressed against a limit stop by said locking member when the scale is locked; and spring means for yieldingly accommodating any tendency of said locking member to be overdriven by said motor due to inertia after said beam lever has abutted against said limit stop.

7. An automatic locking device as set forth in claim 4, wherein said first and second cam-actuated switch means comprises two normally closed switches that are selectively opened by their respective cams; and a pair of self-holding relay switches operatively connected to said cam-actuated switches, respectively, whereby each of said relay switches is energized when its associated cam-actuated switch is closed;

each of said relay switches being connected into the electrical circuit of said motor whereby one of said relay switches is operable to drive said motor in one direction until its associated cam-actuated switch is opened as said locking member approaches said first position;

the other of said relay switches being then energized by closure of its associated cam-actuated switch to drive said motor in the reverse direction until its associated cam-actuated switch is opened as said locking member approaches said second position;

said first-named switch means including a normally open starting switch that is momentarily closed to initiate the operating cycle by energizing said one self-holding relay switch.

8. An automatic locking device for use with a weighing scale having a beam lever fulcrumed near one end thereof for vertical swinging movement, and an operative connection between said beam lever and the indicating mechanism of the scale, said device comprising:

an electric motor;

a rotatable member driven by said motor;

a linearly movable locking member operatively connected to said rotatable member so as to be driven thereby, said locking member being movable between a first position wherein it engages said beam lever to immobilize the same, and a second position wherein said beam lever is released;

means for actuating said motor so that said locking member is successively moved from said first position to said second position, and then from said second position to said first position;

said locking member being smoothly accelerated and moved at a deliberate speed by said rotatable member, whereby said locking member is smoothly and gently retracted from said beam lever, thereby transferring the load on the scale to the beam lever without shock, and said locking member then re-engaging said beam lever smoothly and gently to lock the same again; and means operable to shut off said motor when said locking member has returned to said first position.

9. An automatic locking device for use with a weighing scale having a beam lever fulcrumed near one end thereof for vertical swinging movement, and an operative connection between said beam lever and the indicating mechanism of the scale, said device comprising:
  an electric motor;
  a rotatable member driven by said motor;
  a locking member movable linearly between a first position wherein it engages said beam lever to immobilize the same, and a second position wherein said beam lever is released;
  a driving connection between said rotatable member and said locking member whereby the latter is moved from said first position to said second position during a first half revolution of said rotatable member, and from said second position to said first position during a second half revolution of said rotatable member; and
  means for driving said rotatable member through said first half revolution to unlock said scale, and through said second half revolution to relock said scale;
  said rotatable member being momentarily stopped after completing said first half revolution and before starting said second half revolution, so as to provide a pause for taking the weight of a load on the scale.

10. An automatic locking device for use with a weighing scale having a beam lever fulcrumed near one end thereof for vertical swinging movement, and an operative connection between said beam lever and the indicating mechanism of the scale, said device comprising:
  an electric motor;
  a rotatable member driven by said motor and having a driving projection extending laterally from one side thereof;
  a locking member movable linearly between a first position wherein it engages said beam lever to immobilize the same, and a second position wherein said beam lever is released;
  said locking member having a slot formed therein transverse to the direction of linear travel, said driving projection being slidably received within said slot, whereby said locking member is moved from said first position to said second position during a first half revolution of said rotatable member, and from said second position to said first position during a second half revolution of the rotatable member;
  means for operating said motor to drive said rotatable member through said first half revolution, and then stop;
  means for restarting said motor after a brief pause to drive said rotatable member through said second half revolution; and
  means for stopping said motor as said rotatable member completes said second half revolution.

References Cited by the Examiner

UNITED STATES PATENTS

| 1,043,353 | 11/12 | Paupa et al. | 177—158 X |
| 2,088,354 | 7/37 | Ward | 177—157 X |
| 2,727,736 | 12/55 | Ward et al. | 177—156 |

FOREIGN PATENTS

| 970,018 | 6/50 | France. |

LEO SMILOW, *Primary Examiner.*